US012342837B2

(12) United States Patent
Buche et al.

(10) Patent No.: US 12,342,837 B2
(45) Date of Patent: Jul. 1, 2025

(54) COMPOSITION COMPRISING TEXTURED LEGUMINOUS PROTEINS

(71) Applicant: ROQUETTE FRERES, Lestrem (FR)

(72) Inventors: Thomas Buche, Quiestede (FR); Charlotte Dlubak, Estaires (FR); André Engel, Vreeland (NL)

(73) Assignee: Roquette Freres, Lestrem (FR)

( * ) Notice: Subject to any disclaimer, the term of this patent is extended or adjusted under 35 U.S.C. 154(b) by 660 days.

(21) Appl. No.: 17/309,632

(22) PCT Filed: Dec. 12, 2019

(86) PCT No.: PCT/FR2019/053049
§ 371 (c)(1),
(2) Date: Jun. 11, 2021

(87) PCT Pub. No.: WO2020/120915
PCT Pub. Date: Jun. 18, 2020

(65) Prior Publication Data
US 2022/0046950 A1 Feb. 17, 2022

(30) Foreign Application Priority Data

Dec. 12, 2018 (FR) .................................. 1872778

(51) Int. Cl.
A23J 3/26 (2006.01)
A23J 3/14 (2006.01)
A23J 3/22 (2006.01)
A23L 11/00 (2021.01)

(52) U.S. Cl.
CPC . A23J 3/26 (2013.01); A23J 3/14 (2013.01); A23J 3/227 (2013.01); A23L 11/05 (2016.08)

(58) Field of Classification Search
CPC ...... A23J 3/26; A23J 3/14; A23J 3/225; A23J 3/227; A23J 3/16; A23J 3/22; A23V 2200/15; A23V 2200/262; A23V 2200/264; A23V 2250/5116; A23V 2250/548; A23V 2250/5488; A23V 2300/16; A23L 11/05–07; A23L 33/21–22
See application file for complete search history.

(56) References Cited

U.S. PATENT DOCUMENTS

| 3,843,816 | A | * | 10/1974 | Touba | A23J 3/26 426/802 |
| 3,914,455 | A | * | 10/1975 | Valentas | A23J 3/26 426/511 |
| 3,982,004 | A | * | 9/1976 | Obata | A23L 17/70 426/652 |
| 4,042,715 | A | * | 8/1977 | Wenger | A23J 3/227 426/802 |
| 4,052,517 | A | * | 10/1977 | Youngquist | A23J 3/227 426/802 |
| 4,853,248 | A | * | 8/1989 | Wursch | A23L 11/05 426/457 |
| 4,888,198 | A | * | 12/1989 | Beery | A23J 3/26 426/445 |
| 4,897,280 | A | * | 1/1990 | Ohtsu | A23J 3/225 426/104 |
| 4,943,441 | A | * | 7/1990 | McCabe | A23J 1/14 426/802 |
| 4,968,694 | A | * | 11/1990 | Madsen | A23L 33/22 426/660 |
| 5,225,233 | A | * | 7/1993 | Komatsu | A23P 30/10 426/468 |
| 5,296,253 | A | * | 3/1994 | Lusas | A23L 11/05 426/321 |
| 5,665,419 | A | * | 9/1997 | Teraguchi | A23L 33/17 426/656 |
| 10,477,882 | B1 | * | 11/2019 | Wang | A23J 3/26 |
| 11,484,044 | B1 | * | 11/2022 | Grabinski | A23L 19/00 |
| 12,239,146 | B2 | * | 3/2025 | Pibarot | A23P 30/25 |
| 2004/0043128 | A1 | * | 3/2004 | Duffy | A23L 7/135 426/622 |
| 2005/0233059 | A1 | * | 10/2005 | Harada | A23B 4/08 426/656 |
| 2006/0153965 | A1 | * | 7/2006 | Borders | A23L 11/05 426/634 |
| 2007/0087107 | A1 | * | 4/2007 | Borders | A23P 30/20 426/634 |
| 2007/0269583 | A1 | * | 11/2007 | McMindes | A23J 3/16 426/656 |
| 2011/0311599 | A1 | * | 12/2011 | Boursier | A23J 3/26 507/104 |
| 2012/0171351 | A1 | * | 7/2012 | Solorio | A23L 7/117 426/619 |
| 2015/0289542 | A1 | * | 10/2015 | den Dulk | A23J 3/227 426/615 |
| 2015/0374024 | A1 | * | 12/2015 | Wearly | A23P 30/20 426/516 |
| 2017/0105428 | A1 | * | 4/2017 | Kivelä | A23P 30/20 |
| 2018/0168189 | A1 | * | 6/2018 | Dieker | A23P 30/34 |
| 2019/0045809 | A1 | * | 2/2019 | Lee | A23J 3/227 |
| 2019/0082724 | A1 | * | 3/2019 | Novak | A23L 33/22 |
| 2020/0154734 | A1 | * | 5/2020 | Itkonen | A23J 3/22 |

(Continued)

FOREIGN PATENT DOCUMENTS

FR 2340054 A1 9/1977
FR 2389336 A1 12/1978

(Continued)

OTHER PUBLICATIONS

C-L Heydley et al., "Developing novel pea starches.", Proceedings of the Symposium of the Industrial Biochemistry and Biotechnology Group of the Biochemical Society, 1996, pp. 77-87.

(Continued)

Primary Examiner — Drew E Becker

(57) ABSTRACT

The invention relates to a composition comprising leguminous proteins textured in a dry process, to a method for the production thereof and to the use thereof.

8 Claims, No Drawings

(56) References Cited

U.S. PATENT DOCUMENTS

| | | | |
|---|---|---|---|
| 2020/0305476 A1* | 10/2020 | Sterner | A23J 3/227 |
| 2021/0068420 A1* | 3/2021 | Zhu | A23J 3/227 |
| 2021/0106026 A1* | 4/2021 | Mudgal | A23L 19/09 |
| 2021/0329942 A1* | 10/2021 | Hazell | A23J 3/16 |
| 2023/0098755 A1* | 3/2023 | Wemmer | A23J 3/227 426/574 |
| 2023/0106315 A1* | 4/2023 | Dlubak | A61K 8/645 426/656 |
| 2023/0276824 A1* | 9/2023 | Liu | A23J 3/18 426/615 |
| 2023/0363409 A1* | 11/2023 | Grabinski | A23J 3/16 |
| 2024/0180196 A1* | 6/2024 | Arora | A23J 3/227 |
| 2024/0237675 A1* | 7/2024 | Droulez | A23L 11/00 |
| 2024/0349753 A1* | 10/2024 | Breton | A23J 3/26 |
| 2025/0024858 A1* | 1/2025 | Sakai | A23J 3/346 |
| 2025/0081988 A1* | 3/2025 | Filippi | A23J 3/14 |

FOREIGN PATENT DOCUMENTS

| | | |
|---|---|---|
| JP | S4844869 B1 | 12/1973 |
| JP | 2013078347 A | 5/2013 |
| JP | 2015144593 A | 8/2015 |
| WO | 2006023518 A1 | 2/2006 |
| WO | 2007017571 A1 | 2/2007 |
| WO | 2013036149 A1 | 3/2013 |

OTHER PUBLICATIONS

Wang et al., "Effect of extrusion parameters on water absorption capability of texturized soybean protein," Science and Technology of Food Industry, 2015, (24): 252-255. (The English abstract included).

* cited by examiner

COMPOSITION COMPRISING TEXTURED LEGUMINOUS PROTEINS

PRIOR ART

The present invention relates to a specific composition comprising textured pea proteins, and also to the process for producing same.

The technique for texturing proteins, especially by extrusion cooking, with the goal of preparing products with a fibrous structure intended for producing meat and fish analogs, has been applied to numerous plant sources.

The extrusion cooking processes for proteins can be separated into two large families by the amount of water used in the process. When this amount is greater than 30% by weight, this will be referred to as "wet" extrusion cooking, and the products obtained will be more intended for producing finished products for immediate consumption which simulate animal meat, for example beef steaks or chicken nuggets. When this amount of water is less than 30% by weight, this is then referred to as "dry" extrusion cooking: the products obtained are more intended to be used by food-processing manufacturers, in order to formulate meat substitutes by mixing them with other ingredients. The field of the present invention is that of "dry" extrusion cooking.

Historically, the first proteins used as meat analogs were extracted from soy and wheat. Soybean subsequently quickly became the main source for this field of applications.

While most studies which followed obviously related to soy proteins, other sources of protein, both animal and plant, have been textured: peanut, sesame, cottonseed, sunflower, corn, wheat proteins, proteins derived from microorganisms, by-products from abattoirs or the fisheries industry.

Leguminous proteins, such as those derived from pea and faba bean, have also been the subject of work, both in terms of the isolation thereof and in terms of the "dry" extrusion cooking thereof.

Numerous studies have been undertaken on pea proteins given their particular functional and nutritional properties but also because of their non-genetically-modified nature.

Despite significant research efforts and increasing growth over recent years, these pea protein-based products still have excessively limited market penetration.

One of the reasons limiting this expansion is related to the necessary process for rehydrating textured pea proteins before adding them to formulations.

Indeed, since said proteins are dry, they must be rehydrated in order to be able to shape them and intimately mix them with other constituents of the formulation in order to obtain a satisfactory end result.

To this end, pea proteins textured in a dry process will be brought into contact with an aqueous solution. Unfortunately, the amount of water absorbed for the purposes of rehydration is not effective enough and, without additional human intervention, it is only approximately 50% of the amount required for the following formulation steps.

An additional step, referred to as "shredding" or "cuttering" is therefore commonly carried out, consisting of chopping up the rehydrated textured fibers. The fibers obtained in this way are brought back into contact with an aqueous solution and, due to the chopping, will be able to reabsorb the required missing amount of water.

This step is complicated, since poorly managed chopping may damage the textured pea proteins. In addition, it is an additional preparation step, which makes implementation more complex.

It is to the applicant's credit to have solved the above problems and to have developed a novel specific composition comprising texture pea proteins, obtained by dry extrusion cooking, the implementation of which does not require "shredding" or "chopping".

This invention will be better understood in the following section which aims to disclose a general description thereof.

GENERAL DESCRIPTION OF THE PRESENT INVENTION

The present invention relates to a composition comprising leguminous proteins textured in a dry process, characterized in that the water holding capacity thereof measured by a test A is greater than 3 g of water per g of dry proteins, preferentially greater than 4 g of water per g of dry proteins, more preferentially between 4 g and 5 g.

The leguminous protein is preferably selected from the list consisting of faba bean and pea. Pea is particularly preferred.

Finally, the dry matter of the leguminous protein textured in a dry process according to the invention is greater than 80% by weight, preferentially greater than 90% by weight.

The present invention also relates to a process for producing a composition of leguminous proteins as described above, characterized in that the process comprises the following steps:

1) Providing a powder comprising leguminous proteins and leguminous fibers, having a dry weight ratio of leguminous proteins/leguminous fibers of between 70/30 and 90/10, preferentially of between 75/25 and 85/15;
2) Producing a textured leguminous protein composition having a density of between 40 g/l and 120 g/l, preferentially between 60 g/l and 90 g/l, from the powder obtained in step 1;
3) Compressing the textured pea protein composition obtained in step 2;
4) Optionally drying the composition obtained in this way.

The powder comprising the leguminous proteins and leguminous fibers used in step 1 may be prepared by mixing said proteins and fibers. The powder may essentially consist of leguminous proteins and leguminous fibers. The term "essentially consist of" means that the powder may comprise impurities associated with the process for preparing the proteins and the fibers, for example traces of starch. The leguminous protein and fiber are preferably selected from the list consisting of faba bean and pea. Pea is particularly preferred.

Preferably, step 2 is carried out by extrusion cooking in a twin screw extruder by applying, to the mixture, a specific energy of between 20 and 30 kWh/kg and by regulating the outlet pressure in a range of between 70 and 90 bar. Even more preferably, the twin-screw extruder is characterized by a length/diameter ratio of 60, with an outlet die of a diameter of 27 mm.

Preferably, the temperature of the textured pea protein composition must be between 30° C. and 50° C., preferentially 40° C., during step 3 of compression.

Preferably, the compression of step 3 is characterized in that the texture protein, after compression, has a density of between 100 and 170 g/l, preferentially between 130 g/l and 150 g/l.

Preferably, the compression carried out in step 3 is performed in a drum dryer, especially having a diameter of 300 mm, rotating at a speed of between 10 and 20 rpm, preferentially 16 rpm, fitted with 4 satellite cylinders of 75 mm, the gap between which and the main cylinder is within the range between 0.5 mm and 1.5 mm, preferentially 1 mm.

Finally, the present invention relates to the use of the composition of leguminous proteins textured in a dry process as described above in industrial applications, for example the human and animal food industry, industrial pharmaceuticals or cosmetics.

The present invention will be better understood upon reading the following detailed description.

DETAILED DESCRIPTION OF THE PRESENT INVENTION

The present invention relates to a composition comprising leguminous proteins textured in a dry process, characterized in that the water holding capacity thereof measured by a test A is greater than 3 g of water per g of dry proteins, preferentially greater than 4 g of water per g of dry proteins, more preferentially between 4 g and 5 g.

The leguminous protein is preferably selected from the list consisting of faba bean protein and pea protein. Pea protein is particularly preferred.

The term "leguminous" or "leguminous plants" is considered here to mean the family of dicotyledonous plants of the order Fabales. This is one of the largest flowering plant families, third after Orchidaceae and Asteraceae in terms of number of species. It contains approximately 765 genera, bringing together more than 19,500 species. Several leguminous plants are important crop plants, including soy, beans, peas, faba beans, chickpeas, peanuts, cultivated lentils, cultivated alfalfa, various clovers, broad beans, carob and licorice.

The term "pea" is considered here in its broadest accepted use and includes in particular all the varieties of "smooth pea" and "wrinkled pea" and all the mutant varieties of "smooth pea" and "wrinkled pea", regardless of the uses for which said varieties are usually intended (human food, animal feed and/or other uses).

The term "pea" in the present application includes pea varieties belonging to the Pisum genus and more particularly to the species sativum and aestivum. Said mutant varieties are in particular those named "mutants r", "mutants rb", "mutants rug 3", "mutants rug 4", "mutants rug 5" and "mutants lam" as described in the article by C-L HEYDLEY et al., entitled "Developing novel pea starches," *Proceedings of the Symposium of the Industrial Biochemistry and Biotechnology Group of the Biochemical Society,* 1996, pp. 77-87.

"Textured" or "texturing" is intended in the present application to mean any physical and/or chemical process which aims to modify a composition comprising proteins in order to give it a specific ordered structure. In the context of the invention, the texturing of the protein aims to give the appearance of a fiber, such as those present in animal meats.

In order to measure the water holding capacity, use is made of the test A, the protocol of which is described below:
 a. Weigh 20 g of sample to be analyzed into a beaker
 b. Add drinking water at ambient temperature (20° C.+/− 1° C.) until the sample is completely submerged;
 c. Leave in static contact for 30 minutes;
 d. Separate residual water and sample using a sieve;
 d. Weigh the final weight P of the rehydrated sample;

The calculation for water holding capacity, expressed as grams of water per gram of protein analyzed, is as follows:

Water holding capacity=$(P-20)/20$.

"Drinking water" is intended to mean, in the present invention, water which can be drunk or used for domestic and industrial purposes without posing health risks. It will preferably be understood that this water has a sulfate content of less than 250 mg/l, a chloride content of less than 200 mg/l, a potassium content of less than 12 mg/l, a pH of between 6.5 and 9 and a total hardness (TH, corresponding to the measure of the content of calcium and magnesium ions of a water of greater than 15 French degrees. In other words, a drinking water must not have less than 60 mg/l of calcium or 36 mg/l of magnesium.

As indicated above, the textured pea protein compositions of the prior art are already well known and used in the food industry, in particular in meat analogs. In order to use them in a recipe, it is known that the required water content is at least 3 g per g of proteins, 4 g being preferred. This rehydration will make it possible to prepare the fibers to be included in the formulation, by best simulating the functional properties of meat fibers, and to avoid too great a presence of poorly rehydrated parts, causing a sensation of hardness during final consumption. It is also known that this rehydration cannot be carried out in a single step.

Those skilled in the art will first carry out a first rehydration by placing the textured pea protein with an aqueous solvent, reaching approximately 2 g of water per g of proteins. They will then shred the rehydrated protein fibers. Without wishing to be bound by a particular theory, this shredding will make it possible to destructure the fibers and thus expose the internal parts an enable the hydration thereof. It will therefore be sufficient to replace the rehydrated and destructured protein fibers in contact with the aqueous solvent; the water holding capacity will be at least 4 g per g of proteins.

This protocol is found for example in the technical documentation for NUTRALYS® T70S, produced and sold by the applicant.

Shredding of the proteins is a well-known solution, but it adds a step, making the final formulation process more complex, and causing an increase in cost. Moreover, if this shredding is poorly managed, it will cause too great a destructuring of the fibers, causing a loss of the desired functional effects. Since the plant fibers have been shortened, they will simulate meat fibers less well.

Finally, the dry matter of the leguminous protein textured in a dry process according to the invention is greater than 80% by weight, preferentially greater than 90% by weight.

The dry matter is measured by any method known to those skilled in the art. Preferentially, the "desiccation" method is used. It consists in determining the amount of water evaporated by heating a known amount of a sample of known weight.

The protein content of the composition according to the invention is advantageously between 60% and 80%, preferentially between 70% and 80% by weight relative to the total dry matter. Any method well known to those skilled in the art can be used to analyze this protein content. Preferably, the total nitrogen amount will be assayed and this content will be multiplied by the coefficient 6.25. This method is particularly known and used for plant proteins.

The present invention also relates to a process for producing a composition of leguminous proteins as described above, characterized in that the process comprises the following steps:
 1. Providing a powder comprising leguminous proteins and leguminous fibers, having a dry weight ratio of leguminous proteins/leguminous fibers of between 70/30 and 90/10, preferentially of between 75/25 and 85/15;
2. Producing a textured pea protein composition having a density of between 40 g/l and 120 g/l, preferentially between 60 g/l and 90 g/l, from the powder obtained in step 1;
3. Compressing the textured pea protein composition obtained in step 2;
4. Optionally drying the composition obtained in this way.

The leguminous protein and fiber of step 1 are preferably selected from the list consisting of faba bean protein and pea protein. Pea protein is particularly preferred.

The powder comprising the leguminous proteins and leguminous fibers used in step 1 may be prepared by mixing said proteins and fibers. The powder may essentially consist of leguminous proteins and leguminous fibers. The term "essentially consist of" means that the powder may comprise impurities associated with the process for preparing the proteins and the fibers, for example traces of starch. Mixing consists in obtaining a dry mixture of the different constituents required to synthesize the plant fiber during step 2.

"Leguminous fiber" is intended to mean any compositions comprising polysaccharides which are relatively indigestible or indigestible by the human digestive system, extracted from leguminous plants. Such fibers are extracted by any process well known to those skilled in the art. A commercial example of such a fiber is for example the fiber Pea Fiber I50 by Roquette.

The mixing may be carried out upstream of, or else directly at the supply to, step 2. During this mixing, it is possible to add additives well known to those skilled in the art, such as flavorings or dyes.

In an alternative embodiment, the fiber/protein mixture is naturally obtained by turboseparation of a leguminous flour. The leguminous plant seeds are cleaned, their outer fibers are removed, and they are ground to flour. The flour is then turboseparated, which consists in applying a rising stream of air, enabling the different particles to be separated based on their density. This thus makes it possible to concentrate the content of proteins in the flours from approximately 20% to more than 60%. Such flours are called "concentrates". These concentrates also contain between 10% and 20% of leguminous flours.

The dry weight ratio between proteins and fibers is advantageously between 70/30 and 90/10, preferentially between 75/25 and 85/15.

During step 2, this mixture of powders will then be textured, which is the same as saying that the proteins and fibers will undergo thermal destructuring and reorganization in order to form fibers with continuous elongation in straight, parallel lines, simulating the fibers present in meats. All processes well known to those skilled in the art will be suitable, in particular extrusion.

Extrusion consists in forcing a product to flow through an orifice of small dimension, the die, under the action of high pressures and shearing forces, using the rotation of one or two Archimedes screws. The resulting heating causes cooking and/or denaturing of the product, hence the term sometimes used, "extrusion cooking", then expansion by evaporation of the water at the die outlet. This technique makes it possible to develop products which are widely varied in their composition, their structure (expanded and alveolar form of the product), and their functional and nutritional properties (denaturing of anti-nutritional or toxic factors, sterilization of food, for example). Processing of proteins often leads to structural modifications which are reflected by obtaining products with a fibrous appearance, simulating animal meat fibers.

Through their knowledge and depending on the choice of apparatus, those skilled in the art will carry out this texturing in order to obtain a textured plant protein, the density of which is between 40 and 120 g/l, preferentially 60 and 90 g/l.

To measure this density, the following protocol, referred to as Test B, is applied:
Tare a 2 liter graduated cylinder;
Fill the cylinder with the product to be analyzed. It is sometimes necessary to pack down using small taps on the wall of the cylinder, in order to be sure that the product fills the 2 liter volume.
Weight the product (Weight P (in grams).

$$\text{Density} = (P(g)/2(L))$$

Preferably, step 2 is carried out by extrusion cooking in a twin screw extruder by applying, to the mixture, a specific energy of between 20 and 30 kWh/kg and by regulating the outlet pressure in a range of between 70 and 90 bar. Even more preferably, the twin-screw extruder is characterized by a length/diameter ratio of 60, with a die diameter of 27 mm.

Under these conditions, for a substance flow rate of approximately 35 kg/h, water will also be introduced at a flow rate of between 5 and 7 kg/h, preferentially between 5.5 and 6.5 kg/h.

The preferred screw profile used will comprise the following distribution of elements:
Between 80 and 95% feeding elements;
Between 2.5 and 10% kneading elements;
Between 2.5 and 10% reverse thread elements.

Those skilled in the art will know, through their fundamental knowledge of this technology, how to obtain the perfect setting in order to obtain the desired density.

These procedure conditions make it possible to readily obtain textured proteins, the density of which is suitable for the majority of extrusion cookers on the market. Those skilled in the art will know how to easily adapt these conditions, if needed.

Preferably, the temperature of the textured pea protein composition during step 3 of compression must be between 30° C. and 50° C., preferentially 40° C.

If the density of the extruded proteins is less than or greater than the abovementioned range, step 3 below may not be able to be carried out effectively.

Preferably, the compression of step 3 is characterized in that the texture protein, after compression, has a density of between 100 and 170 g/l, preferentially between 130 g/l and 150 g/l.

Step 3 aims to compress, using mechanical pressure, the proteins extruded in step 2. Surprisingly, this compression, carried out on a textured protein with a density of between 40 and 120 g/l, preferentially 60 and 90 g/l, makes it possible to obtain a textured protein, the final retention of which is optimal without shredding. Indeed, those skilled in the art should have expected, after compression, the complete destructuring of the textured protein by this mechanical compression, such that these functional capacities are negated. The applicant has in fact established that the opposite is true, as long as the protocol described in this application is followed.

Any type of apparatus enabling the mechanical compression of the textured protein in order to cause the density thereof to rise to a value of between 100 and 170 g/l, preferentially between 130 g/l and 150 g/l, is suitable.

Preferably, the compression carried out in step 3 is performed in a drum dryer, especially having a diameter of 300 mm, rotating at a speed of between 10 and 20 rpm, preferentially 16 rpm, fitted with 4 satellite cylinders of 75 mm, the gap between which and the main cylinder is within the range between 0.5 mm and 1.5 mm, preferentially 1 mm. A particularly preferred apparatus is Tummers Machinebrouw B.V. type 350323.

Finally, the present invention relates to the use of the composition of leguminous proteins textured in a dry process as described above in industrial applications, for example the human and animal food industry, industrial pharmaceuticals or cosmetics. A particular application relates to the use of the composition according to the invention for the manufacture of meat substitutes, especially of minced meat.

The invention will be better understood upon reading the nonlimiting examples below.

EXAMPLES

Example 1A: Production of a Composition of Leguminous Proteins Textured in a Dry Process According to the Invention A powder mixture consisting of 87% NUTRALYS® F85M from ROQUETTE and 13% I50M pea fiber is produced.

This mixture is introduced by gravity into a LEISTRITZ ZSE 27 MAXX extruder from LEISTRITZ.

The mixture is introduced with a regulated flow rate of 35 kg/h. An amount of 5.5 kg/h of water is also introduced.

The extrusion screw, composed of 85% feeding elements, 5% kneading elements and 10% reverse pitch elements, is rotated at a speed of between 1100 and 1200 rpm and sends the mixture to a die.

This particular procedure generates a machine torque of 42% with an outlet pressure of 91 bar. The specific energy of the system is approximately 24 KWh/kg.

The product is directed at the outlet toward a die consisting of a 3 mm cylindrical hole, from which the textured protein is expelled, which is then cut into segments of approximately 1 mm using knives.

A density measurement of the extruded protein using test B gives a value of 59 g/l.

The extruded protein thus produced is then deposited at the top of the main cylinder (with a diameter of 300 mm) of a Tummers MachineBouw B.V. type 3500323 drum dryer.

The cylinder is rotated at a speed of 16 rpm, said rotation also driving the 4 peripheral cylinders (with a diameter of 75 mm). The gap or distance between main cylinder and peripheral cylinders is 1 mm.

The protein is deposited at a temperature of approximately 40° C. and will be compressed between the different cylinders, then will fall into a container at the bottom of the drum dryer.

Example 1 B: Production of a Composition of Leguminous Proteins Textured in a Dry Process According to the Invention A powder mixture consisting of 100% VESTKORN "Faba Protein" faba bean concentrates, containing 65% proteins and 15% fibers, is produced.

This mixture is introduced by gravity into a COPERION ZSK 54 MV extruder from COPERION.

The mixture is introduced with a regulated flow rate of 350 kg/h. An amount of 65 kg/h of water is also introduced.

The extrusion screw, composed of 85% feeding elements, 5% kneading elements and 10% reverse pitch elements, is rotated at a speed of between 950 and 1100 rpm and sends the mixture to a die.

This particular procedure generates a machine torque of 50±2% with an outlet pressure of 82±2 bar. The specific energy of the system is approximately 24 KWh/kg.

The product is directed at the outlet toward a die consisting of a 5 mm cylindrical hole, from which the textured protein is expelled, which is then cut into segments of approximately 3 cm using knives.

A density measurement of the extruded protein using test B gives a value of 84 g/l.

The extruded protein thus produced is then deposited at the top of the main cylinder (with a diameter of 300 mm) of a Tummers MachineBouw B.V. type 3500323 drum dryer.

The cylinder is rotated at a speed of 16 rpm, said rotation also driving the 4 peripheral cylinders (with a diameter of 75 mm). The gap or distance between main cylinder and peripheral cylinders is 1 mm.

The protein is deposited at a temperature of approximately 40° C. and will be compressed between the different cylinders, then will fall into a container at the bottom of the drum dryer.

Example 2: Production of a Composition of Leguminous Proteins Textured in a Dry Process According to the Prior Art A powder mixture consisting of 87% by weight of NUTRALYS® F85M from ROQUETTE and 13% by weight of I50M pea fiber is produced.

This mixture is introduced by gravity into a LEISTRITZ ZSE 27 MAXX extruder from LEISTRITZ.

The mixture is introduced with a regulated flow rate of 35 kg/h. An amount of 6.5 kg/h of water is also introduced.

The extrusion screw, composed of 85% feeding elements, 5% kneading elements and 10% reverse pitch elements, is rotated at a speed of between 1100 and 1200 rpm and sends the mixture to a die.

This particular procedure generates a machine torque of 41% with an outlet pressure of 70 bar. The specific energy of the system is approximately 220 kw/kg.

The product is directed at the outlet toward a die consisting of two 3 mm cylindrical holes, from which the textured protein is expelled, which is then cut into segments of approximately 1 mm using knives.

A density measurement of the extruded protein gives a value of 100 g/l.

Example 3: Comparison of the Compositions of Leguminous Proteins Textured in a Dry Process Obtained in the Above Examples and of Compositions Originating from the Prior Art The protocols described above in the description are implemented in order to measured the density according to test B and the water holding according to test A.

The water holding "with shredding" is also measured by modifying test A as indicated below:
 a. Weigh 40 g of sample to be analyzed into a beaker;
 b. Add drinking water at ambient temperature (20° C.+/− 1° C.) until the sample is completely submerged;
 c. Leave in static contact for 30 minutes;

d. Pour water+textured protein into a KENWOOD blender fitted with a non-cutting pastry attachment and mill for 45 seconds at speed 1;
e. Separate residual water and sample using a sieve;
f. Weigh the final weight P of the rehydrated sample.

The calculation for water holding capacity, expressed as grams of water per gram of protein analyzed, is as follows:

Water holding capacity (in g)=(P−40)/40.

TABLE 1

| | Dry matter (%) | Density (g/l) | Water holding without shredding (g water/g) 30 min | Water holding with shredding (g water/g) 30 min |
|---|---|---|---|---|
| Composition according to example 1A according to the invention | 95 | 116 | 4.8 | 4.8 |
| Composition according to example 1B according to the invention | 94 | 161 | 3.74 | 4.65 |
| Composition according to example 2 outside the invention | 93 | 100 | 2.6 | 4.7 |
| NUTRALYS ® T70S | 94 | 124 | 2.7 | 4.6 |

It can thus be seen that only the products according to the invention 1A and 1B make it possible to obtain a composition, the Water Holding Capacity of which according to test A (without shredding) is greater than 3 g of water per gram of composition comprising textured proteins.

To achieve this performance level, the compositions according to the prior art required a shredding or cuttering step.

Example 4: Use of a Composition of Leguminous Proteins Textured in a Dry Process According to the Invention in Meat Analogs A hamburger or burger patty is produced using the compositions presented in examples 1A and 2.

The ingredients used are as follows (the amounts indicated in the table below are given in grams per 100 g of finished burger):

TABLE 2

| Ingredients | Burger recipe #1 | Burger recipe #2 | Burger recipe #3 |
|---|---|---|---|
| Drinking water | 53.55 | | |
| Composition according to example 1A | 19.5 | | |
| Composition according to example 2 (outside the invention) | | 19.5 | |
| Nutralys T70S | | | 19.5 |
| Crushed ice | 6 | | |
| Methyl cellulose | 2 | | |
| Onions | 5.9 | | |
| Sunflower oil | 5.4 | | |
| Native potato starch | 2 | | |
| Pea Fiber I50 (Roquette) | 3 | | |
| Garlic powder | 0.5 | | |
| Salt | 0.2 | | |
| Black pepper | 0.1 | | |

The production procedure is as follows:
1. Hydrate the textured proteins in drinking water for 30 min.
2. Only for burgers 2 and 3 (outside the invention), mill the textured protein/water mixture for 45 s using a KENWOOD automatic mixer, then leave in contact for a further 30 min.
3. Mix methyl cellulose and crushed ice into a container, then place in refrigerator for 5 min.
4. Mix all the other ingredients in another container.
5. Combine the mixtures obtained in steps 1 (or 2), 3 and 4 in the same container, and mix in order to obtain a homogeneous composition.
6. Form the burger patties by hand with the final mixture of an amount of approximately 150 g.

After tasting by a panel of 10 people, it is accepted that burger #1 is closest to an animal meat burger: the fibrous sensation is more present therein during tasting.

The invention claimed is:

1. A method for producing a composition of leguminous proteins textured in a dry process, said dry process being defined as a process in which the amount of water used in said process is less than 30% by weight, wherein the water holding capacity of the textured composition of leguminous proteins obtained from said method is measured by a test A of a) weighing 20 g of sample to be analyzed into a beaker, b) adding drinking water at ambient temperature (20° C.+/−1° C.) until the sample is completely submerged, c) leaving in static contact for 30 minutes, d) separating residual water and sample using a sieve, and e) weighing the final weight P of the rehydrated sample, and wherein the calculation for water holding capacity, expressed as grams of water per gram of protein analyzed, is as follows: water holding capacity=(P−20)/20, is greater than 3 g of water per g of dry proteins, the method for producing the composition of leguminous proteins comprising the steps of:
   1. providing a powder comprising leguminous proteins and leguminous fibers having a dry weight ratio of leguminous proteins/leguminous fibers of between 70/30 and 90/10;
   2. producing a textured leguminous protein composition having a density of between 40 g/l and 120 g/l;
   3. compressing the textured leguminous protein composition obtained in step 2, wherein the textured protein, after compression, has a density of between 100 and 170 g/l;
   4. optionally drying the compressed composition obtained in step 3.

2. The method according to claim 1, wherein the water holding capacity thereof measured is between 4 g and 5 g of water per g of dry proteins.

3. The method according to claim 1, wherein powder comprising leguminous proteins and leguminous fibers of step 1 have a dry weight ratio of leguminous proteins/leguminous fibers of between 75/25 and 85/15.

4. The method according to claim 1, wherein the temperature of the textured and compressed leguminous protein composition obtained from step 3 is between 30° C. and 50° C.

5. The method according to claim 4, wherein temperature of the textured and compressed leguminous protein is 40° C.

6. The method according claim 1, wherein the compression carried out in step 3 is performed in a drum dryer comprising a main cylinder having a diameter of 300 mm, rotating at a speed of between 10 and 20 rpm, fitted with 4 satellite cylinders of 75 mm, and wherein the gap between the main cylinder and satellite cylinders being within the range between 0.5 mm and 1.5 mm.

7. The method according to claim 6, wherein the compression carried out in step 3 is performed in the drum dryer rotating at a speed of 16 rpm.

8. The method according to claim 6, wherein the gap between the satellite cylinders and the main cylinder is of 1 mm.

* * * * *